(12) United States Patent
Campbell

(10) Patent No.: US 7,802,291 B2
(45) Date of Patent: Sep. 21, 2010

(54) SYSTEMS AND METHODS FOR PROVIDING ZIP CODE LINKED WEB SITES

(75) Inventor: Leo J. Campbell, Arlington, VA (US)

(73) Assignee: United States Postal Service, Washington, DC (US)

(*) Notice: Subject to any disclaimer, the term of this patent is extended or adjusted under 35 U.S.C. 154(b) by 1053 days.

(21) Appl. No.: 10/362,805

(22) PCT Filed: Sep. 10, 2001

(86) PCT No.: PCT/US01/28300
§ 371 (c)(1),
(2), (4) Date: Feb. 27, 2003

(87) PCT Pub. No.: WO02/21258
PCT Pub. Date: Mar. 14, 2002

(65) Prior Publication Data
US 2004/0133799 A1 Jul. 8, 2004

Related U.S. Application Data

(60) Provisional application No. 60/231,340, filed on Sep. 8, 2000.

(51) Int. Cl.
G06F 7/04 (2006.01)
G06F 17/30 (2006.01)
H04M 3/42 (2006.01)
G06F 15/16 (2006.01)
H04W 36/00 (2009.01)

(52) U.S. Cl. ............... 726/4; 726/18; 726/26; 709/226; 709/229; 455/414.2; 455/456.5; 455/433; 455/440

(58) Field of Classification Search ............. 726/4
See application file for complete search history.

(56) References Cited

U.S. PATENT DOCUMENTS 5,561,836 A * 10/1996 Sowles et al. ............... 455/428

(Continued)

OTHER PUBLICATIONS

Weidong, Chen. Lin, Eric. "Route Optimization and Location Updates for Mobile Hosts". May 1996. Relevant pp. 319-326. Proceedings of the 16th International Conference on Distributed Computing Systems. On the World Wide Web at: http://ieeexplore.ieee.org/iel3/3771/11006/00507930.pdf?tp=&isnumber=11006&arnumber=507930&punumber=3771.*

(Continued)

*Primary Examiner*—William R Korzuch
*Assistant Examiner*—Jeremiah Avery
(74) *Attorney, Agent, or Firm*—Finnegan, Henderson, Farabow, Garrett & Dunner, LLP

(57) ABSTRACT

A system and method that establishes a network node containing public and private information related to a plurality of geographic zones or ZIP Codes; receives a request from a user to access the node (1004); enables the user to view the information related to a zone; receives a user selection of private or public informaton (1008). If private information is selected, determines whether the user is a resident of a geographic area corresponding to the zone (1016); and modifies the user information contained in the node for the zone in response to a user request, it is determined that the user resides in the geographic area corresponding to the zone. If the public information is selected (1010), in response to the user's request, searches the public information (1012) and providing the user with general information relevant to the zone (1012).

63 Claims, 13 Drawing Sheets

U.S. PATENT DOCUMENTS

| | | | |
|---|---|---|---|
| 5,862,220 A * | 1/1999 | Perlman ..................... 713/162 |
| 5,862,339 A | 1/1999 | Bonnaure et al. |
| 5,936,869 A * | 8/1999 | Sakaguchi et al. ............. 703/1 |
| 5,946,615 A | 8/1999 | Holmes et al. |
| 6,133,853 A * | 10/2000 | Obradovich et al. ........ 340/905 |
| 6,182,142 B1 * | 1/2001 | Win et al. ................... 709/229 |
| 6,332,098 B2 * | 12/2001 | Ross et al. ................. 700/226 |
| 6,351,218 B1 * | 2/2002 | Smith ......................... 340/601 |
| 6,457,129 B2 * | 9/2002 | O'Mahony ..................... 726/4 |
| 6,525,768 B2 * | 2/2003 | Obradovich ........... 348/231.99 |
| 6,535,743 B1 * | 3/2003 | Kennedy et al. ......... 455/456.1 |
| 6,615,264 B1 * | 9/2003 | Stoltz et al. ................. 709/227 |
| 6,629,136 B1 * | 9/2003 | Naidoo ....................... 709/219 |
| 6,697,843 B1 * | 2/2004 | Carlin et al. ................ 709/206 |
| 6,757,740 B1 * | 6/2004 | Parekh et al. ............... 709/245 |
| 6,831,682 B1 * | 12/2004 | Silverbrook et al. ..... 348/207.2 |
| 6,965,872 B1 * | 11/2005 | Grdina ........................ 705/26 |

OTHER PUBLICATIONS

Coddington, P.D.; Hawick, K.A.; James, H.A. "Web-Based Access to Distributed High-Performance Geographic Information Systems for Decision Support". 32nd International Conference on System Sciences. Pub. Date: Jan. 1999. Relevant pp. 1-12. On the World Wide Web at: http://ieeexplore.ieee.org/stamp/stamp.jsp?tp=&arnumber=772613.*

* cited by examiner

FIG. 9

SYSTEMS AND METHODS FOR PROVIDING ZIP CODE LINKED WEB SITES

RELATED APPLICATIONS

Under provisions of 35 U.S.C. § 119(e), the applicants claim the benefit of U.S. provisional application serial No. 60/231,340, filed Sep. 8, 2000, which is hereby expressly incorporated herein by reference.

DESCRIPTION OF THE RELATED ART

1. Technical Field

The present invention relates to a system and method for communicating and retrieving public information and modifying private information associated with a geographic area. More particularly, the present invention, which is illustrated by specific embodiments, involves communicating and retrieving public information and modifying private information associated with a geographic area via a network.

2. Background of the Invention

The Internet has been hailed as the information source of the future, as a result of its accessibility and usability. Almost any computer equipped with a communication mechanism such as a modem and telephone connection can gain access to the Internet. A program called a browser, such as the Netscape Navigator from Netscape Corporation, makes it a simple task to traverse the vast network of information available on the Internet and, specifically, its subpart known as the "World Wide Web."

The architecture of the Web follows a conventional client-server model. The terms "client" and "server" are used to refer to a computer's general role as a requester of data (the client) or provider of data (the server). Under the web environment, web browsers reside in clients and content, in the form of specially formatted "web documents," resides on Internet (web) servers. Web clients and web servers communicate using a conventional protocol called "HyperText Transfer Protocol" (HTTP).

In operation, a browser opens a connection to a server and initiates a request for a document. The server delivers the requested document, typically in HTML format. After the document is delivered, the connection is closed. The browser displays the document or performs a function designated by the document.

Every day, more people gain access to the Web, and every day, more of them are shopping and gathering information online. However, in order for Internet users to gather information (e.g., demographic, socioeconomic, housing, and commercial information) related to a specific geographic area, defined, for example, by one or more postal ZIP Codes, users must use a search-enabled web site. Utilizing the web site, users must then conduct a search and sort through, and perhaps combine, the returned information to compose a summary of the topic of interest associated with the geographic area.

Even if the search-enabled web site allows the user to focus the search to a city and/or surrounding areas, the conducted search requires two stages. The first stage includes a search of the selected city and the second stage includes a search of the surrounding area. Users are unable to conduct a multi-stage search in which the user may initiate the search in one geographic area and then at the user's direction slowly expand the search to encompass other adjacent geographic areas, until the user receives a satisfactory response.

In addition to the Internet, systems utilizing other communication networks such as the public switch network using Internet protocols, and Virtual Private networks (VPNs), which provides protected communications over the Internet, enable users also to conduct searches. These searches, however, do not enable users to conduct a multi-stage search in which the user may initiate the search in one geographic area and then at the user's direction slowly expand the search to encompass other adjacent geographic areas, until the user receives a satisfactory response.

Therefore, there is a need for a system and method that efficiently enables users to retrieve and communicate public information and modify private information associated with a geographic area.

SUMMARY OF THE INVENTION

Consistent with the present invention, a system and method for retrieving and communicating public information and modifying private information, related to a selected postal ZIP Code or geographic area, is provided that avoids the problems associated with current systems and methods.

In one aspect, a system and method consistent with the present invention provides geographic information via a network that comprises establishing a network node containing public and private information related to a plurality of geographic zones or ZIP Codes, administered by the United States Postal Service (USPS); receiving a request from a user to access the network node; enabling the user to view the information related to a geographic zone or ZIP Code; and receiving a user selection for private or public information.

If the user selects the private information, the node determines whether the user is a resident of a geographic area or ZIP Code corresponding to the zone. If it is determined that the user is a resident of the geographic area or ZIP Code, in response to the user's request, the user is allowed to modify the user's information contained for the geographic zone or ZIP Code.

If the user selects the public information, in response to a user's request, the node may search the public information and provide the user with general information relevant to the geographic zone or ZIP Code.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings:

FIG. 9 is an illustration of a resident information web page consistent with the present invention.

DESCRIPTION OF THE PREFERRED EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Network Architecture

Figure 1:
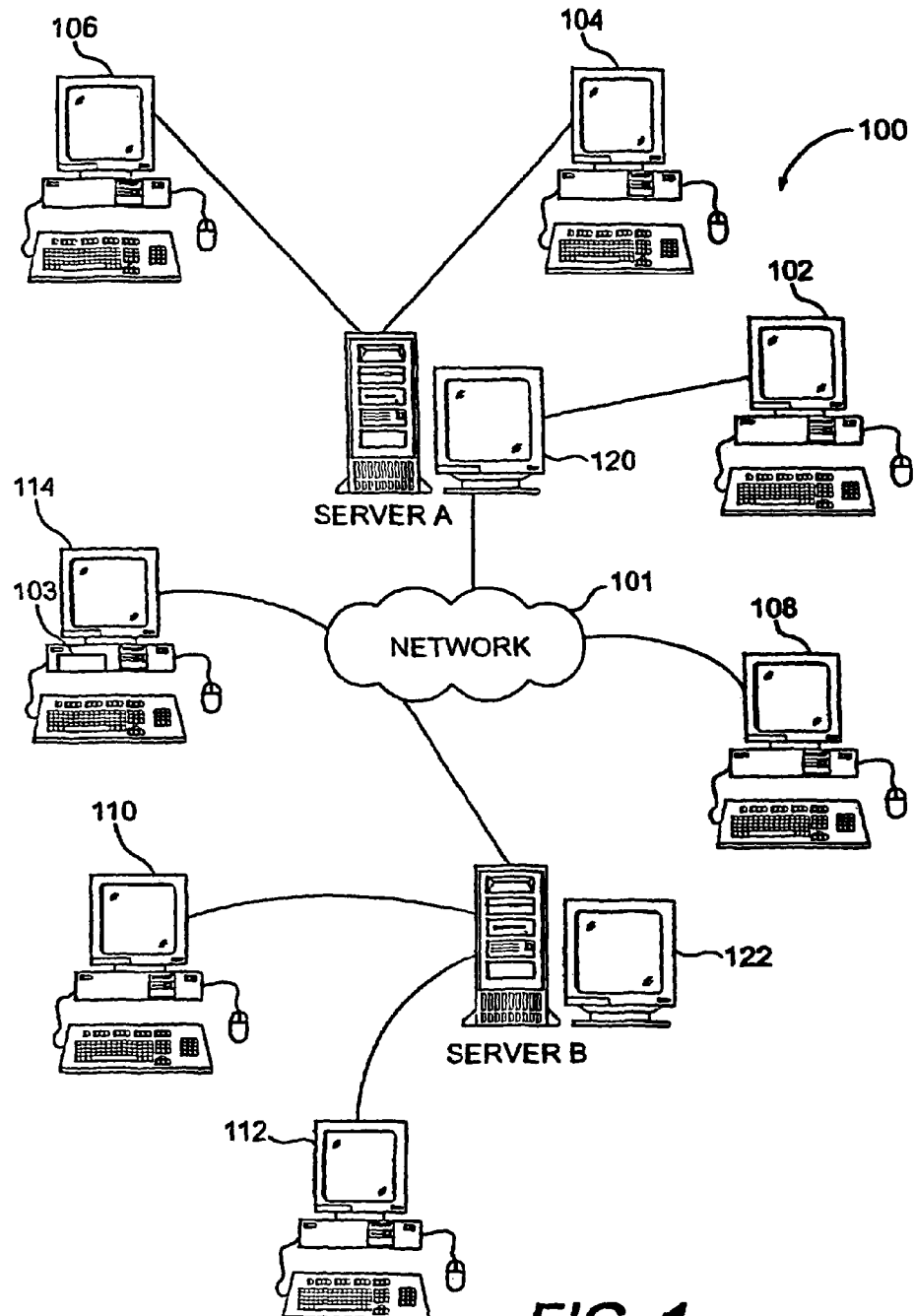
FIG. 1 is a conceptual diagram of a computer network consistent with the present invention.

FIG. 1 illustrates a conceptual diagram of a computer system 100 interconnected in various ways, including through a network 101, such as the Internet. Computer system 100 comprises nodes such as small computers (such as computers 102, 104, 106, 108, 110, 112 and 114) and large computers (such as servers 120 and 122). In general, small computers are "personal computers" or workstations and are the sites at which a human user operates the computer to make requests for data from other computers or servers on the network. Usually, the requested data resides in large computers. In this scenario, small computers are clients and the large computers are servers.

In this specification, the terms "client" and "server" are used to refer to a computer's general role as a requester of data (client) or provider of data (server). In general, the size of a computer or the resources associated with it do not preclude the computer's ability to act as a client or a server. Further, each computer may request data in one transaction and provide data in another transaction, thus changing the computer's role from client to server, or vice versa.

A client node, such as computer 102, may request a file from a node such as server A 120. Since computer 102 is directly connected to server A 120, for example, through a local area network, this request would not normally result in a transfer of data over network 101. A different request from computer 102 may be for a file that resides in server B 122. In this case, the data is transferred from server B 122 through network 101 to server A 120 and, finally, to computer 102. Network 101 may be a wireless, coaxial cable, or any other type of electronic communications network. The distance between server A 120 and server B 122 may be very long, e.g. across continents, or very short, e.g., within the same city. Further, in traversing the network the data may be transferred through several intermediate servers and many routing devices, such as bridges and routers.

Figure 2:
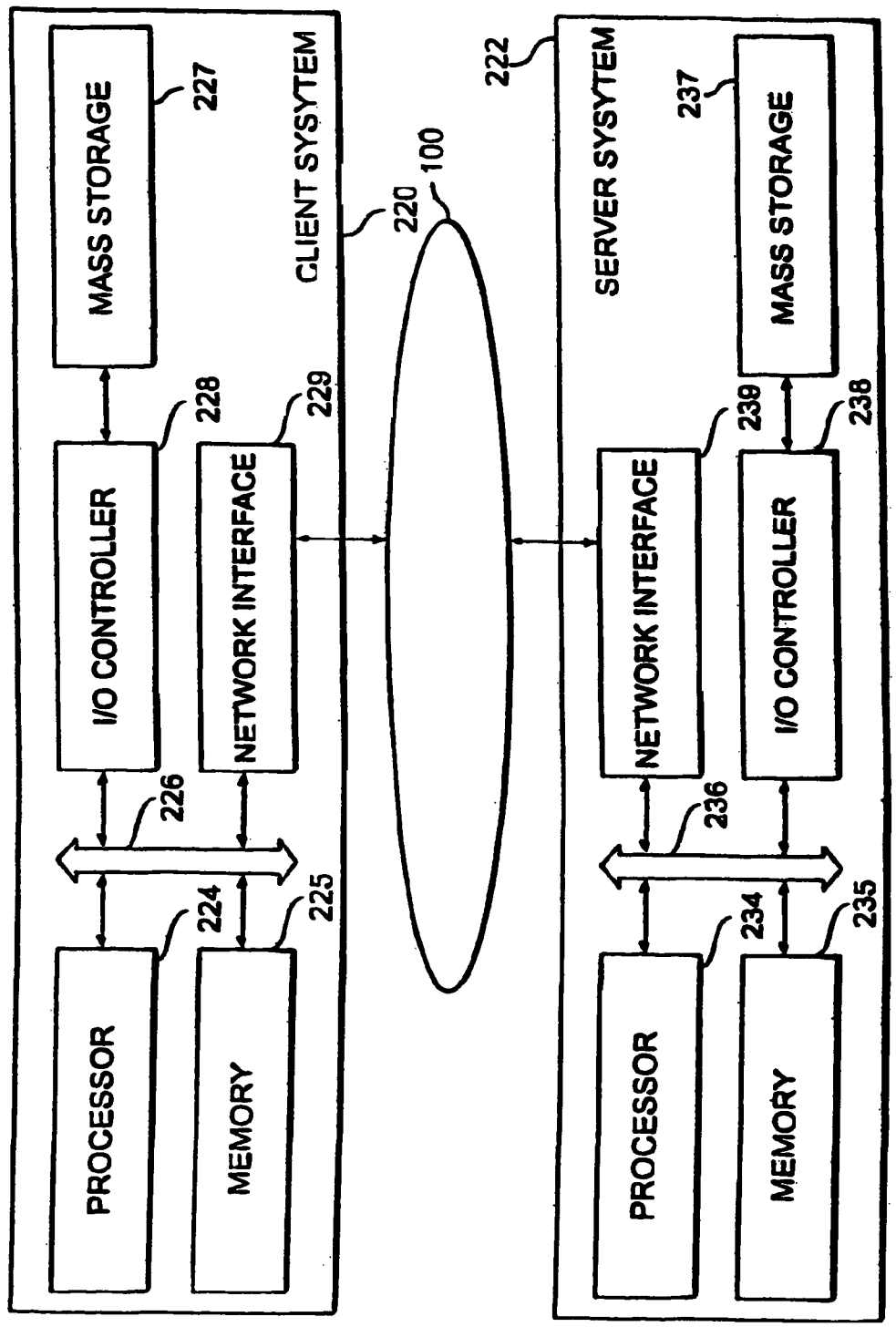
FIG. 2 is a diagram illustrating an example of a client-server system interconnected through a network consistent with the present invention.

FIG. 2 shows, in more detail, a portion of system 100. In this example, server B 122 is interconnected through network 101 to a client 108. Client 108 includes conventional components such as a processor 224, a memory 225 (e.g. RAM), a bus 226 which couples processor 224 and memory 225, a mass storage device 227 (e.g. a magnetic hard disk or an optical storage disk) coupled to processor 224 and memory 225 through an I/O controller 228 and a network interface 229, such as a conventional modem.

Server B122 also includes conventional components such as a processor 234, a memory 235 (e.g. RAM), a bus 236 which couples processor 234 and memory 235, a mass storage device 237 (e.g. a magnetic or optical disk) coupled to processor 234 and memory 235 through an I/O controller 238 and a network interface 239, such as a conventional modem. It will be appreciated from the description below that the present invention may be implemented in software which is stored as executable instructions on a computer readable medium on the client and server systems, such as mass storage devices 227 and 237 respectively, or in memories 225 and 235 respectively.

Distributed Document Retrieval

The Internet consists of a worldwide computer network that communicates using well defined protocol known as the Internet Protocol (IP). Nodes that are directly connected to the Internet each have an unique address consisting of four numbers separated by periods such as "192.101.0.3". To simplify Internet addressing, a "Domain Name System" was created that allows users to access Internet resources with a simpler alphanumeric naming system. For example, the name "USPS.com" is the name for a computer operated by the United States Postal Service.

To further define the addresses of resources on the Internet, a Uniform Resource Locator system was created that uses a Uniform Resource Locator (URL) as a descriptor that specifically defines a type of Internet resource and its location. URLs have the following format: "resource-type://domain-.address/path-name." The "resource-type" defines the type of Internet resource. Web documents, for example, are identified by the resource type "http", which indicates the protocol used to access the document.

To access a document on the Web, the user enters a URL for the web document into a browser program executing on a client system with a connection to the Internet. The web browser then sends a request in accordance with the HTTP protocol to the web server that has the web document using the URL. The web server responds to the request by transmitting the requested object to the client. In many cases, the object is a plain text document containing text (in ASCII) that is written in HTML. Such objects often contain "hyperlinks," that is, connections to other web documents. The web browser displays the HTML document on the screen for the user and the hyperlinks to other web documents are emphasized in some fashion such that the user can select the hyperlink.

Exemplary Embodiment

An exemplary embodiment of the present invention will be explained using the system architecture explained above in conjunction with FIGS. 1 and 2. In the exemplary embodiment, a user utilizes a client and a browser, such as computer 114 and browser 103, to enter a URL for a node such as the United States Postal Service. Browser 103 then sends a request for the USPS home web page through network 101 to the node at a web server, such as server A 120. Server A 120 contains public and private information related to a plurality of geographic zones, such as postal ZIP Codes.

The request from browser 103 to server A 120 is transmitted in accordance with the HTTP protocol. Server A 120 responds to the request by transmitting the requested object (i.e., the USPS home Web page) to browser 103 through network 101, thus enabling the user to view information related to a geographic zone.

Figure 3:
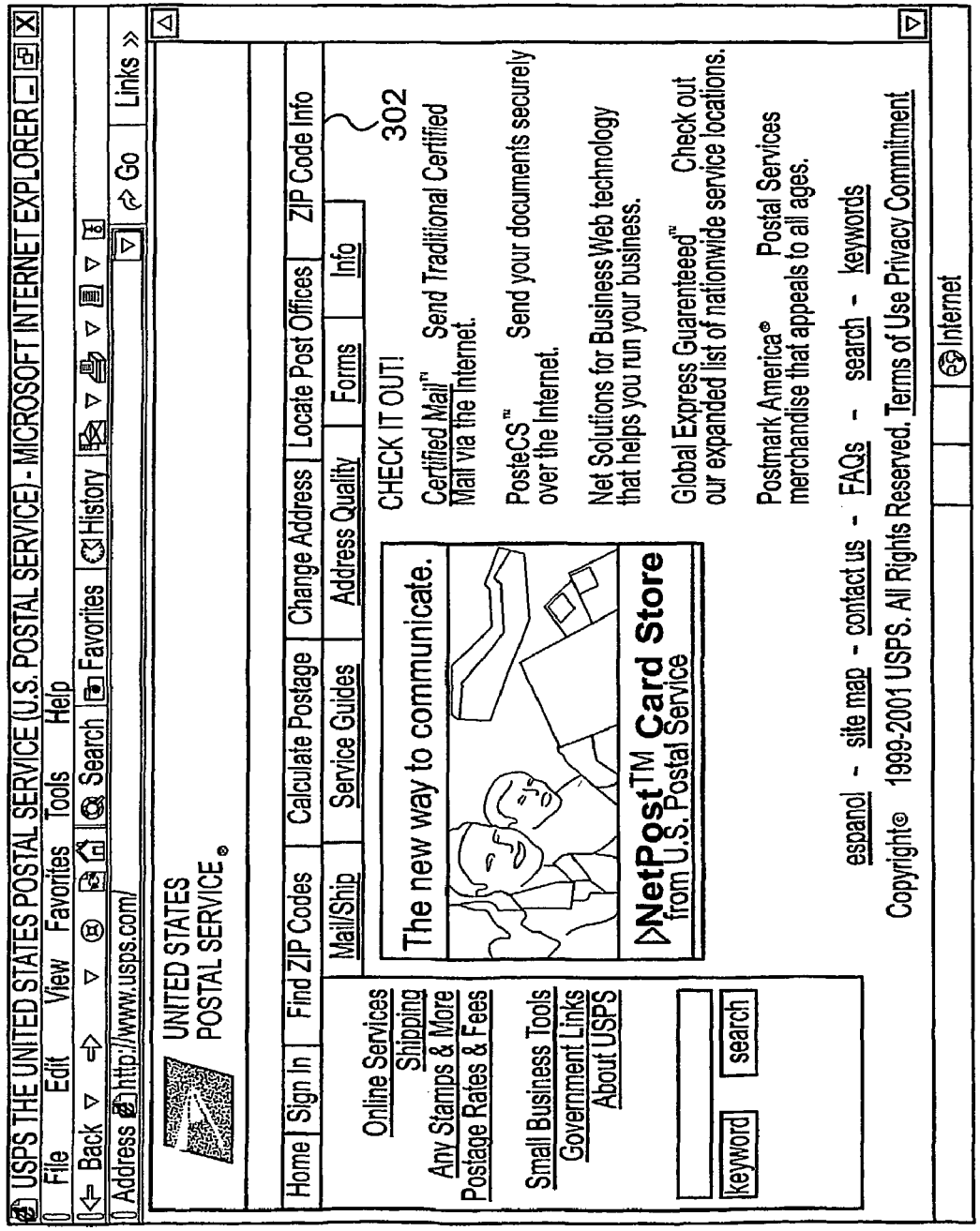
FIG. 3 is an illustration of a home web page consistent with the present invention.

Once home web page 100, illustrated in FIG. 3, is presented on browser 103, the user, among other selectable items on the home web page, may select a clickable area 302 associated with text indicating that ZIP Code information is available. It is important to note that, whenever the user selects a clickable area and submits a request for another web page containing information, the request from browser 103 is sent to server A 120, and server A 120 responds with the requested web page. The request and the response are both transmitted via the HTTP protocol.

Figure 4:
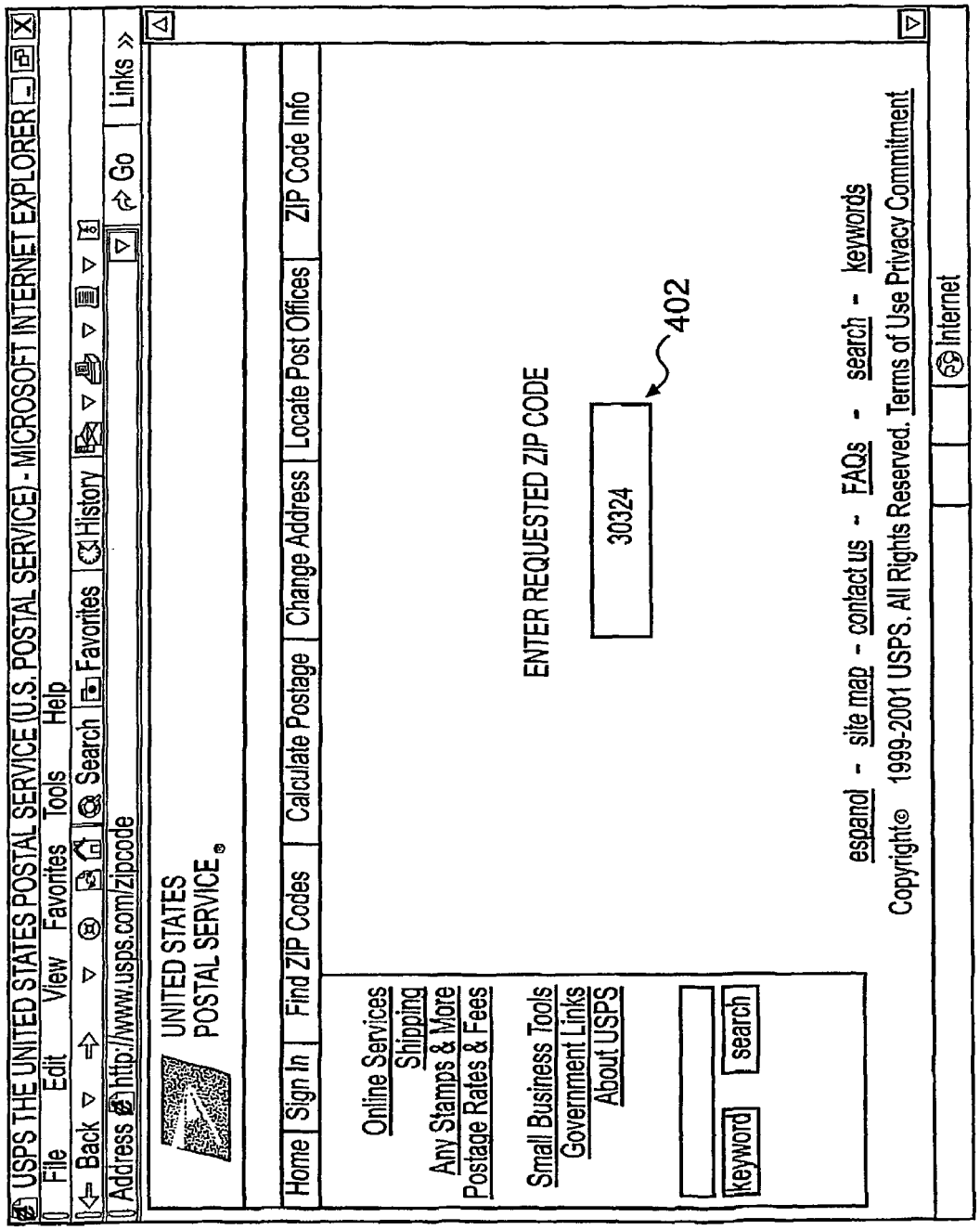
FIG. 4 is an illustration of a zip request web page consistent with the present invention.

In this exemplary embodiment, If the user selects clickable area 302, a request is submitted to server A 120 and it responds to browser 103 with a zip request web page 400 (FIG. 4). The user may then enter in entry box 402 the ZIP Code from which information is requested. For example, the user may enter the ZIP Code "30324," which represents a geographic area in Atlanta, Ga.

Figure 5:
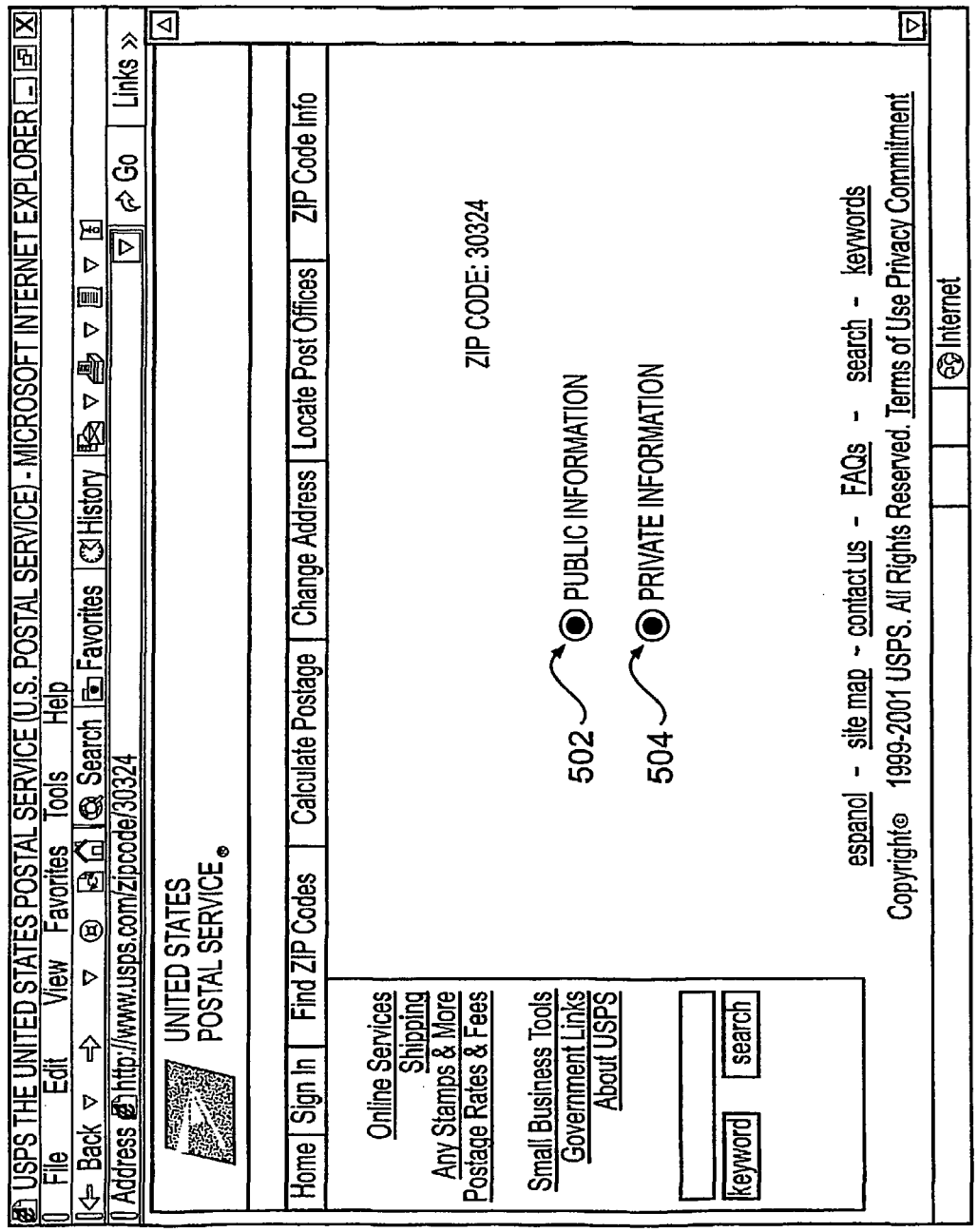
FIG. 5 is an illustration of a private/public web page consistent with the present invention.
Figure 6:
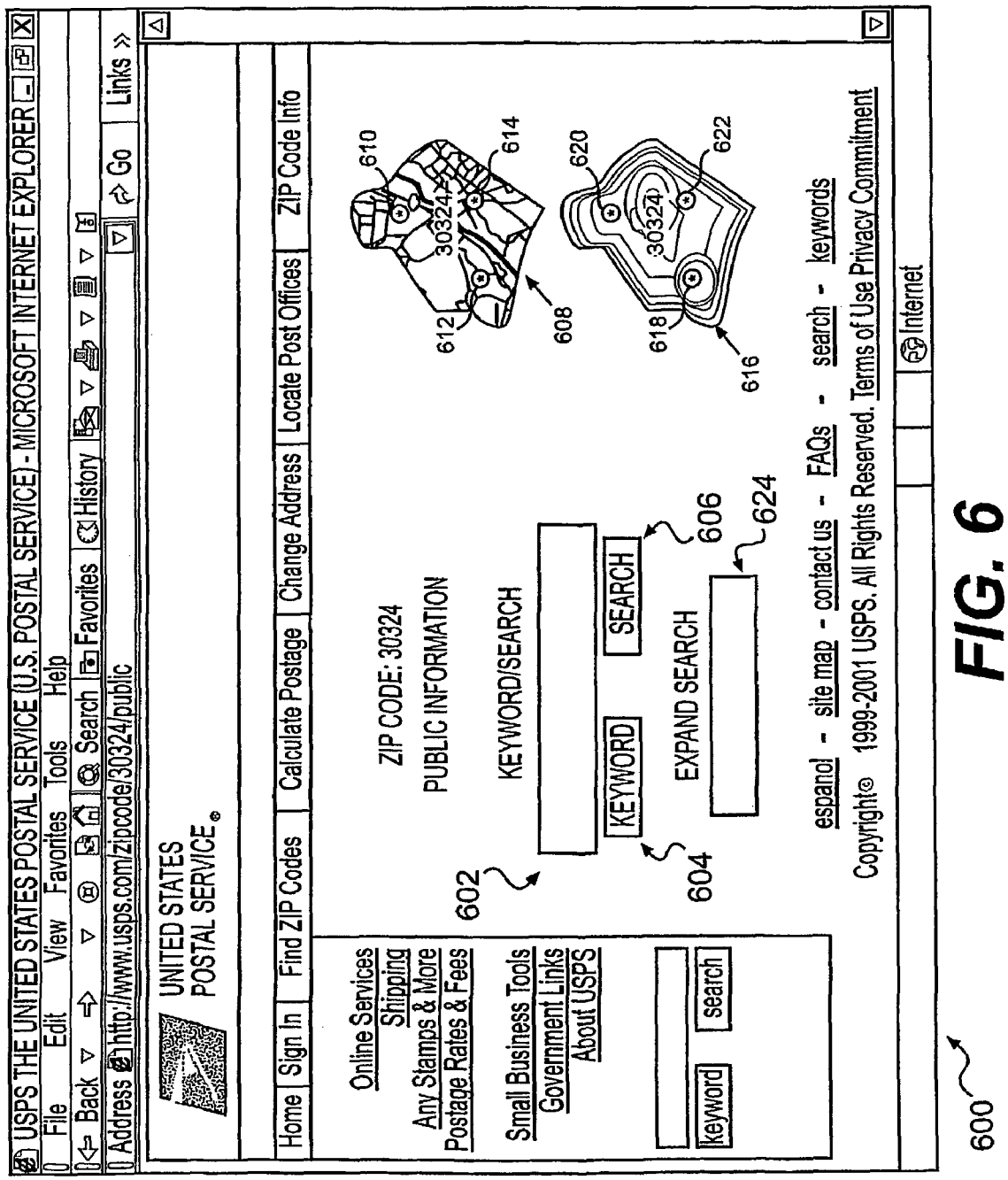
FIG. 6 is an illustration of a public information web page consistent with the present invention.

In response to the request, server A 120 provides browser 103 with a private/public web page 500 (FIG. 5), thus enabling the user in the displayed web page to select between private and public information by selecting one of the clickable areas on private/public web page 500. If the user selects the clickable area 502, browser 103 will submit a request to server A 120 for the public information web page 600 (FIG. 6). Server A 120 responds to the request by transferring public information web page 600 to browser 103.

In public information web page 600, the user may enter a keyword or search term, in data entry box 602, that may be associated with the information that the user may want to retrieve. By clicking on the keyword button 604 or search button 606, the user through browser 103 submits a request for a keyword or term search to server A 120. Server A 120 responds to the request to the keyword or term search by providing any public information, which may be stored, for the given ZIP Code area that is associated with the keyword or search term. The stored information may include, for example, general information about the ZIP Code, such as demographic, socioeconomic, and housing information. The general information stored for any given ZIP Code or geographic area may be compiled from commercial databases.

Additionally, public information web page 600 may present a map, such as map 608 or aerial image 616 of the ZIP Code area, so that the user may click on a desired area (clickable areas 610-614 and 618-622) as a way of refining a search. This map feature for refining a search may be available to a user before or after a related key word or term search is undertaken.

For example, a user may start by choosing a geographic subset, which may be represented by clickable areas (610-614 and 618-622) on map 608 and aerial image 616. Then, if the user undertakes a search, this search may only encompass the chosen geographic subset. In contrast, a user may start with a search engine search and then further refine the search by choosing a particular geographic subset from map 608 or aerial image 616.

Furthermore, in contrast to refining a search using map 608 or aerial image 616, a user may expand the search by selecting expand search button 614. After an initial search within the selected ZIP Code (e.g., ZIP Code 22201), the user may expand the search to surrounding ZIP Codes in a multi-stage process. The system thus searches the public information, in response to a user request, and provides the user with general information relevant to the ZIP Code or geographic area.

Figure 7B:
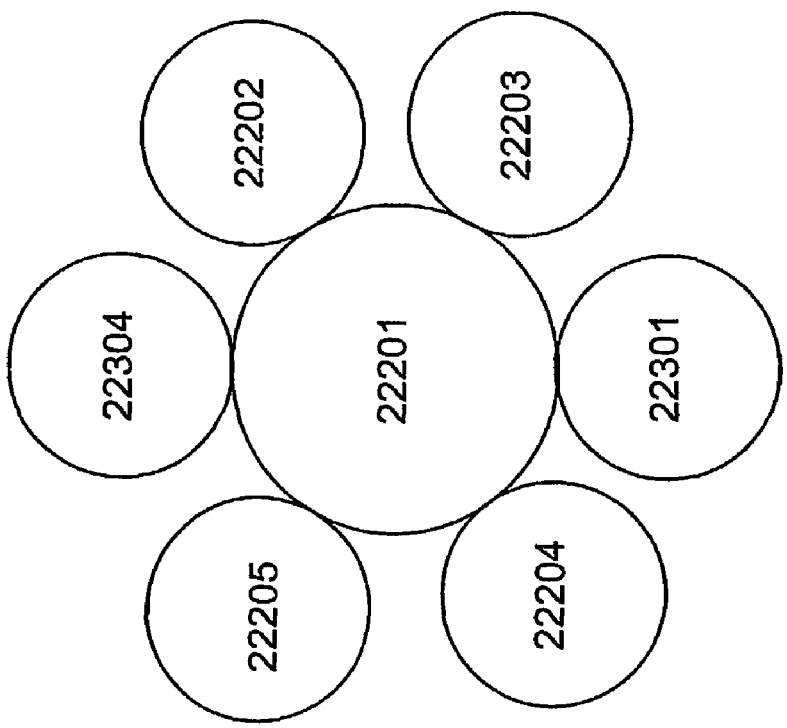
FIGS. 7A and 7B are illustrations of an expanding multi-stage search consistent with the present invention.
Figure 7A:
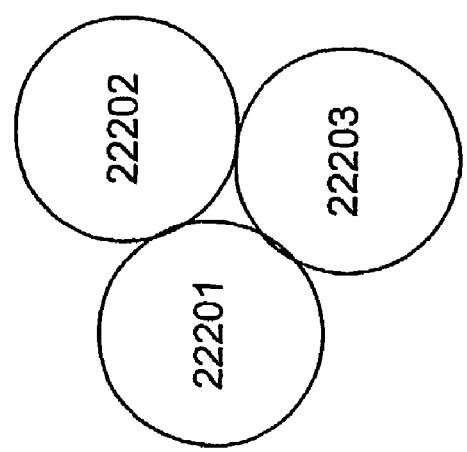

FIGS. 7A-7B illustrates an example of the multi-stage search process. FIG. 7A illustrates that if a user conducts a search for a shoe repair shop within ZIP Code "22201" and did not receive an adequate response, by selecting expand search button 624, the search may be automatically expanded to the bordering ZIP Codes (e.g., ZIP Codes 22202 and 22203). Further yet, if the user does not receive an adequate response from this expanded search, the user may again select expand search button 624 and further expand the search, as illustrated in FIG. 7B. FIG. 7B illustrates that the search has now been expanded to include other bordering ZIP Codes (e.g., ZIP Codes 22204, 22205, 22304, and 22301).

Therefore, the "expand search" feature of one embodiment of the present invention enables the user to initiate a search in a geographic area (i.e., a ZIP Code) and then continually expand the search to other surrounding geographic areas (i.e., other surrounding ZIP Codes) until an adequate response is received. The other surrounding areas searched may not be within the same city and state.

Figure 8:
FIG. 8 is an illustration of a private information web page consistent with the present invention.

Returning to private/public web page 500 (FIG. 5), if at private/public web page 500, the user selects the clickable area 504, browser 103 will submit a request to server A 120 for the private information web page 800 (FIG. 8). Server A 120 responds to the request by transferring a private information web page 800 to browser 103.

Private information web page 800 is an entry point to a proprietary area of the web site that requires the user to authenticate the user's residence within the ZIP Code area. For authentication, the user may be required to enter a first name 802, a last name 804, an address 806, and a password 808 into private web page 800. Once the user has entered the required information, if the user selects process button 810, browser 103 submits an authentication request to server A 120. However, if the user decides not to submit an authentication request, the user may select the clear form button 812 and exit private information web page 800.

Figure 9:
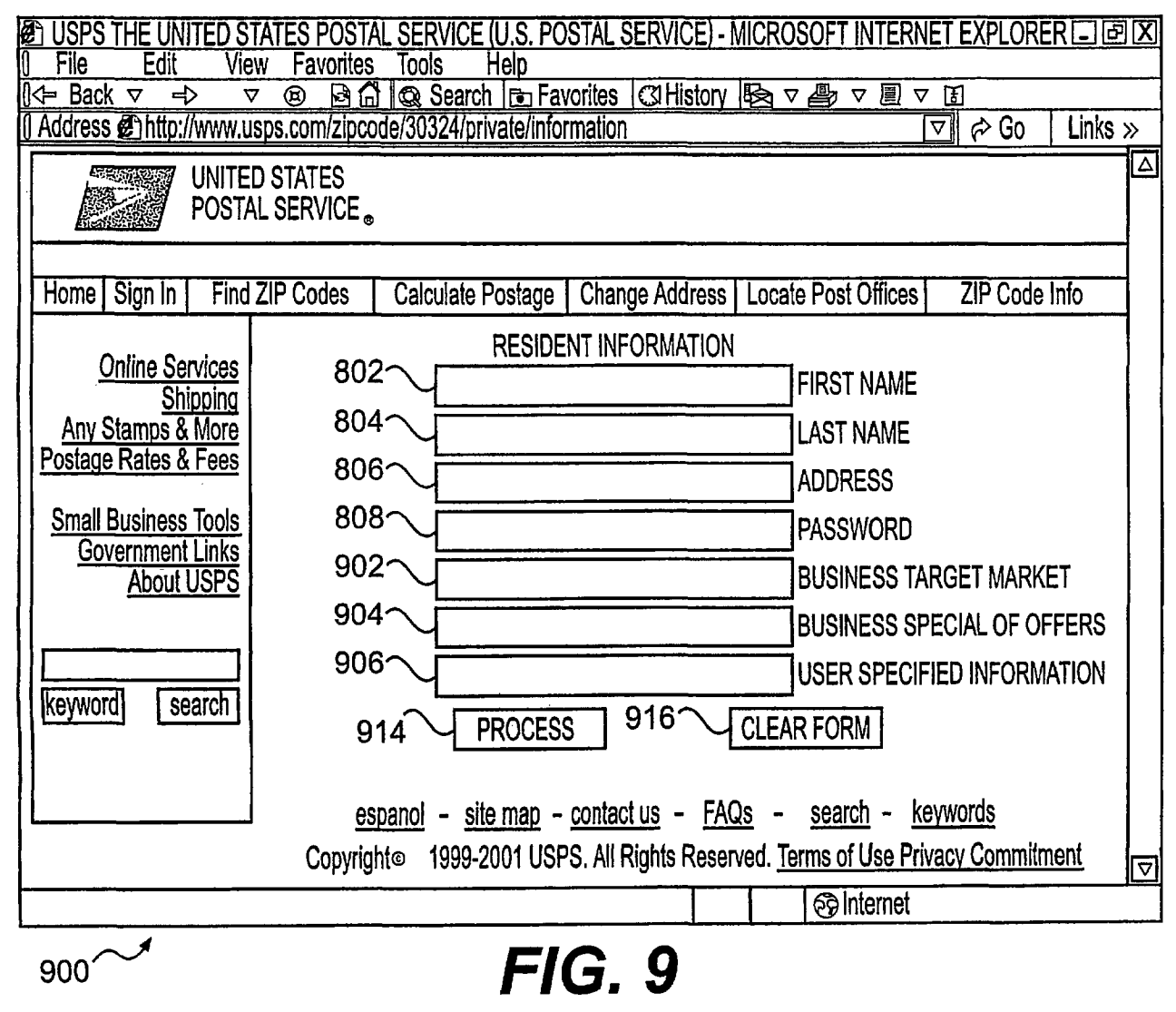

Assuming that the user selected process button 810 to proceed with the authentication, and the user resides in the selected ZIP Code area, server A 120 authenticates the user and responds by providing the resident information web page 900 (FIG. 9) to browser 103. Server A 120 may authenticate the user utilizing a digital certificate to uniquely identify the user and to provide authorization for the user to access the private information. An exemplary digital certificate of authority is described in U.S. Ser. No. 09/809,325, filed Mar. 16, 2001, by Leo J. Campbell et al. and titled "Methods and Systems for Proofing Identities Using a Certificate Authority," the entire disclosure of which is expressly incorporated herein by reference.

In resident information web page 900, the user may access and change (i.e., add, delete, modify, etc.) the user's authentication information, which may include, for example, the user's first name 802, last name 804, address 806, password 808, business target market 902, business special offers 904, and other user specified information 906. It is important to note that for the purposes of this description the user may be an individual or an entity residing in the selected ZIP Code or geographic area (e.g., a business, a non-profit organization, a religious organization, etc.).

As an example of the function of one of the above mentioned fields, in business special offers 904, a shoe repair shop in a given ZIP Code may modify its information to indicate that it is having a special. When a user utilizes public information web page 600, as explained above, the user will be informed that if two pairs of shoes are brought to Joe's Shoe Shop they can be re-heeled and re-soled for $5.

Once the information is modified in resident information web page 900, the user may submit the modified information by selecting process button 914. In response to the user selecting process button 914, browser 103 transmits a request to server A 120 for the user information to be updated. The updated information may then be aggregated with all of the other information for the particular ZIP Code area.

However, if the user decides not to modify the resident information, the user may select the clear form button 916 and exit resident information web page 900.

System Method of Operation

Figure 10:
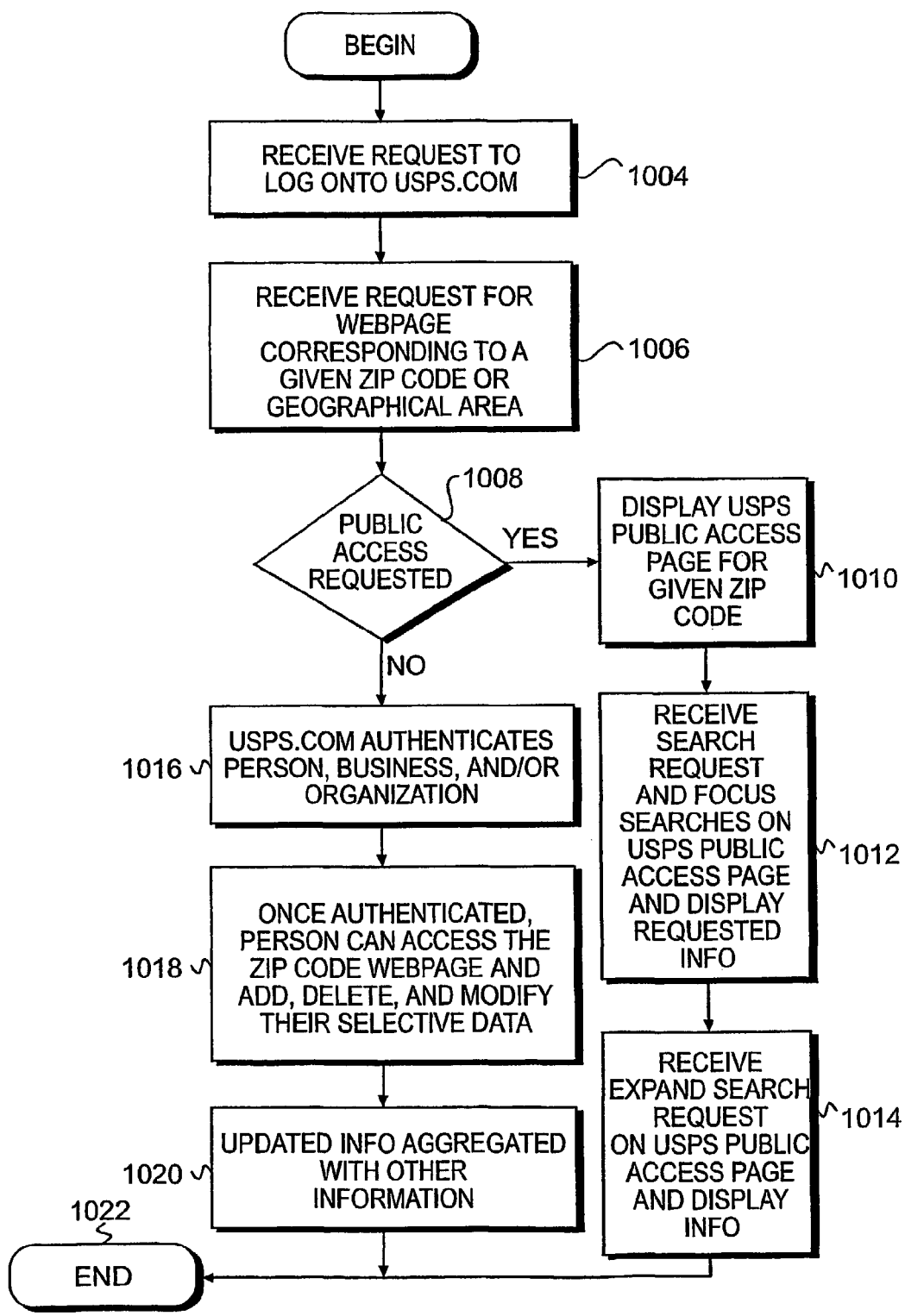
FIG. 10 is a flow chart of one method for accessing public information and modifying private information consistent with the present invention.

FIG. 10 is a flow chart of a method for communicating and retrieving public information and modifying private information, in accordance with one embodiment of the present invention. FIG. 10 illustrates that a node receives a request from a user to log onto a web site, such as USPS.com (1004). Once the user is log on, the node receives a request for a web page related to a geographic zone, such as a ZIP Code (1006). In response the node, displays the web page corresponding to the given ZIP Code. The node may then receive a request to access one of two main areas of the web page. One area provides public information corresponding to the given ZIP Code and the other provides private user information.

If the node receives a request for the public access, the node displays the USPS public access web page for a given ZIP Code (1008 and 1010). The public access area may include, for example, information on local businesses, restaurants, and professional service providers in the ZIP Code area. The public access area for the given ZIP Code could also include general information about the ZIP Code, such as demographic, socioeconomic, and housing profiles, for example. The public access information about the ZIP Code may be compiled from commercial databases for display in the public access area.

Once the public access web page is displayed, the node may receive a request for a search using a keyword or search term that may be associated with the information that the user may want to retrieve. By clicking on the keyword button 604 or search button 606 (FIG. 6), the user submits a request for a keyword or term search 1012. After the result to the search is returned or before the search is conducted, the node may receive an input using a map or aerial image of the ZIP Code area, as a way of focusing the search 1012, before the requested information is displayed.

Furthermore, in contrast to refining a search using the map or the aerial image, the node may receive a request to expand the search by using an expand search button 614 (FIG. 6) 1014. After an initial search within the selected ZIP Code (e.g., ZIP Code 22201), the node may receive a request to expand the search to surrounding ZIP Codes in a multi-stage process, where the search is expanded to adjacent surrounding areas until the node displays a favorable result or receives a request to end the search 1022.

If the node does not receive a request for the public access area of the web page, the node may receive a request to access a proprietary area of the web page that requires authentication of the users residence within the ZIP Code 1016. The node may authenticate the user, for example, utilizing a digital certificate to uniquely identify the user and to provide authorization for the user to access the proprietary area. Once authenticated, the node may receive a request to access and change the resident's authentication data (i.e., add, delete, modify, etc.) 1018. Once the information is updated, it is aggregated with all of the other information for that ZIP Code area 1020 and the method ends 1022.

Figure 11:
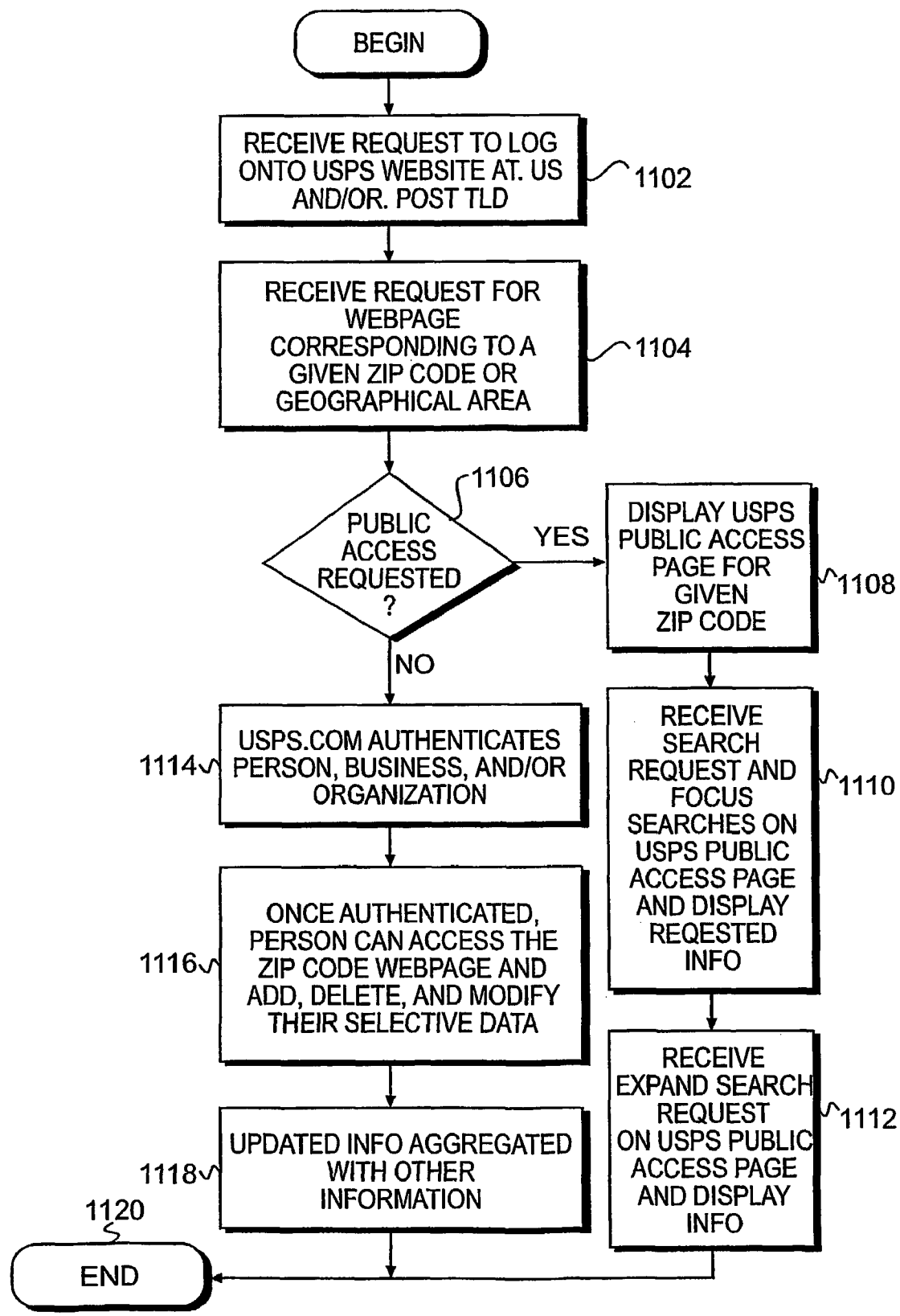
FIG. 11 is a flow chart of a second method for accessing public information and modifying private information consistent with the present invention.

FIG. 11 illustrates a flow chart of an alternative embodiment, with ZIP Code linked web sites under the top level domain (TLD) names of .us' and/or ".post." The basic idea is the same as the embodiment above using USPS.com, but the ".us" and ".post" refers to an addressing scheme which is more robust than using USPS.com. These TLDs are available from the Internet Corporation for Assigned Names and Numbers ("ICANN"), which is the addressing and numbering committee that determines the top level domains in the Internet addressing scheme, such as ".com", ".org", ".edu", and ".net". The ".post" TLD may be available to the United States Postal Service (USPS) or to postal administrations worldwide.

Many postal administrations, such as Royal Mail in England, may set up an address scheme in the form of somebody or something at royal_mail.post.uk. If the USPS were administering ".us", the same scheme could be used in America. However, if the USPS does not administer the ".us" TLD, it might be less intuitive for users to know that their own postal administration in the U.S. has its own domain which may be upost."us" or simply ".post".

FIG. 11 illustrates that a node receives a request from a user to log onto the USPS web site at ".us" and/or ".post" (1102). Once the user logs on, the node may receive a request for a web page corresponding to a geographic area, such as a ZIP Code (1104). The node may then receive a request to access one of two main areas of the web page. One area provides public information corresponding to the given ZIP Code and the other provides private user information.

If the node receives a request for the public access, the node displays the USPS public access web page for a given ZIP Code (1106 and 1108). The public access area may include, for example, information on local businesses, restaurants, and professional service providers in the ZIP Code area. The public access area for the given ZIP Code could also include general information about the ZIP Code, such as demographic, socioeconomic, and housing profiles, for example. The public access information about the ZIP Code or geographic area may be compiled from commercial databases for display in the public access area.

Once the public access web page is displayed, the node may receive a request for a search using a keyword or search term that may be associated with the information that the user may want to retrieve. By clicking on the keyword button 604 or search button 606 (FIG. 6), the user submits a request for a keyword or term search 1110. After the result to the search is returned or before the search is conducted, the node may receive an input using a map or aerial image of the ZIP Code area, as a way of focusing the search 1110, before the requested information is displayed.

Furthermore, in contrast to refining a search using the map or the aerial image, the node may receive a request to expand the search by using an expand search button 614 (FIG. 6) 1112. After an initial search within the selected ZIP Code (e.g., ZIP Code 22201), the node may receive a request to expand the search to surrounding ZIP Codes in a multi-stage process, where the search is expanded to adjacent surrounding areas until the node displays a favorable result or receives a request to end the search 1120.

If the node does not receive a request for the public access area of the web page, the node may receive a request to access a proprietary area of the web page that requires authentication of the user's residence within the ZIP Code 1114. The node may authenticate the user, for example, utilizing a digital certificate to uniquely identify the user and to provide authorization for the user to access the proprietary area. Once authenticated, the node may receive a request to access and change the resident's authentication data (i.e., add, delete, modify, etc.) 1116. Once the information is updated, it is aggregated with all of the other information for that ZIP Code area 1120 and the method ends 1120.

Exemplary Method for Storing and Retrieving User Information

Figure 12:
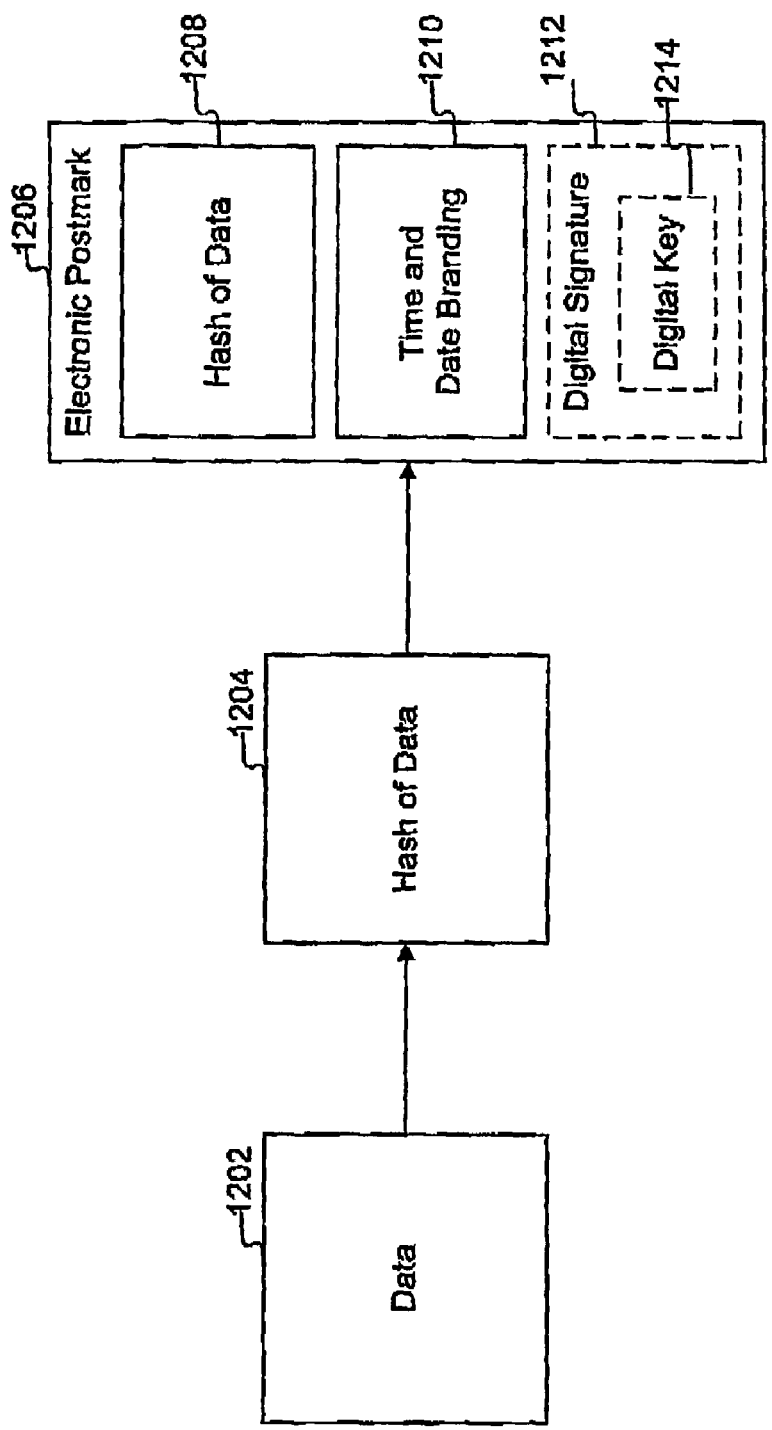
FIGS. 12 and 13 illustrate an exemplary method of processing a user's request and storing information consistent with the present invention.
Figure 13:
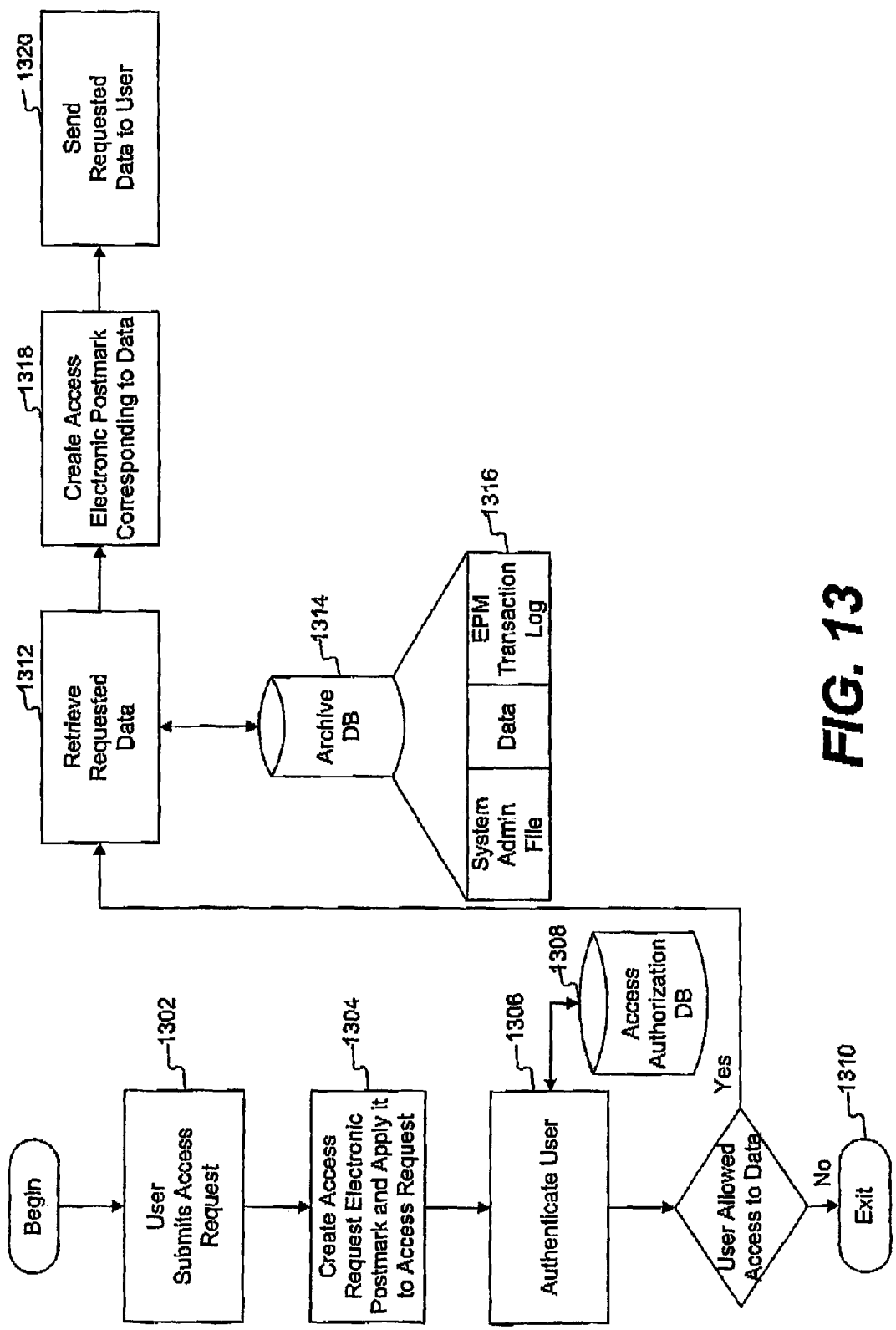

In accordance with one embodiment of the present invention FIGS. 12 and 13 illustrate an exemplary method of processing a user's request and storing information. In the exemplary method, an electronic postmark (EPM) may be used to track the receipt of the user's request to change his information. An exemplary EPM is described in U.S. Ser. No. 09/675,677, filed Sep. 29, 2000, by Leo Campbell et al. and titled "Systems and Methods for Authenticating an Electronic Message," the disclosure of which is expressly incorporated herein by reference in its entirety. The EPM may include the time and date of the request, and user's identification information, and allows a system to keep track of request transactions. Thereafter, the system creates a storage EPM 1206 based on an electronic file containing the user's information.

The system creates the storage EPM 1206 by generating a hash file 1208 from an electronic file 1202, and storing the hash file 1204 in storage EPM 1206. The component may generate hash file 1204 using known hashing techniques, such as a Secure Hash Algorithm ("SHA-1), a technique based on an algorithm provided by Rivest, Shamir, and Adelman ("RSA"), and a Message Digest algorithm ("MD5"). This component also stores in storage EPM 1206 a time and date stamp 1210 to indicate the time and date of the storage of the electronic file. In addition, the component may store in storage EPM 1206 a digital signature 1212, a digital key 1214 for digitally securing the storage EPM 1206, as well as customer identification information all may be store in EPM 1206.

Thereafter, this component stores the storage EPM 1206 in an archive database. The archive database may include tables for storing storage EPMs, logs for EPM transactions, and archive administrator system files. The electronic file may remain in storage for a length of time that is determined by the user. The archive database will be discussed below in conjunction with FIG. 13.

FIG. 13 is a flowchart showing a method for retrieving archived information by the user. As shown in FIG. 13, a user may submit an access request for an archived electronic file containing the user's information (stage 1302). The access request includes information identifying the archived electronic file and customer identification information, such as a digital certificate and optionally the user's first name, last name, address, password, business target market, business special offers, and other user specified information. The information identifying the archived electronic file may include, for example, a filename for the electronic file. The archive administrator component creates an access request EPM based on the customer identification information, and applies it to the access request by generating a record for the transaction in transaction log 1316 in archive database 1314 (stage 1304). The access request EPM may be used to track access requests for the archived electronic file and may include the time and date of the access request, and customer identification information.

An archive administrator component (not shown) then verifies whether the user is allowed to access the archived electronic file, using information in authorization database 1308, customer identification information, and information identifying the archived electronic file (stage 1306). If the user is not allowed access to the archived electronic file ("No"), the archive administrator component may send an appropriate message to the user and terminates the transaction (stage 1310). Otherwise ("Yes"), the archive administrator component retrieves a copy of the archived electronic file from archive database 1314 (stage 1312). More specifically, the archive administrator component retrieves the storage EPM 1206 from archive database 1314 based on the customer identification information and the information identifying the archived electronic file. Next, the archive administrator component retrieves the archived electronic file from the hash of data 1208 in the storage EPM 1206.

In addition, the archive administrator component creates an access EPM and applies it to the archived electronic file by generating a record for the transaction in a transaction log 1316 in the archive database 1314 (stage 1318). An access EPM includes the time and date on which the access request was processed by the archive system.

Thereafter, the archive administrator component provides the user access to the electronic file by sending the copy of the electronic file to the user over network 101 (FIG. 1) (stage 1320). The user may then make changes to the electronic file, and may request the revised electronic file be archived by the archive system. For additional details on the archive system refer to U.S. Ser. No. 10/362,506, filed Sep. 7, 2001, by Leo J. Campbell et al. and titled "Methods and Systems for Providing Electronic Archiving," the entire disclosure of which is expressly incorporated herein by reference.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

CONCLUSION

As explained, systems and methods consistent with the present invention permits users to communicate and retrieve public information, and modify private information associated with a specific geographic area or ZIP Code. The foregoing description of implementations of the invention has been presented for purposes of illustration and description. It is not exhaustive and does not limit the invention to the precise form disclosed. Modifications and variations are possible in light of the above teachings or may be acquired from practicing of the invention: For example, the described implementation includes software but the present invention may be implemented as a combination of hardware and software or in hardware alone. The invention may be implemented with both object-oriented and non-object-oriented programming systems. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A computer-implemented method for providing geographic information via a network, comprising the steps of:

establishing a network node containing public and private information related to a plurality of geographic zones;

receiving a first request from a user to access the node;

enabling the user to view the information related to a geographic zone;

receiving a user selection of private or public information;

if private information is selected, determining whether the user is a resident of a geographic area corresponding to the zone;

and if it is determined that the user is a resident of the geographic area corresponding to the zone, modifying user information contained in the node for the zone in response to a second user request, and storing an electronic postmark in an archive database to record the second user request, wherein the electronic postmark includes a digital signature;
if the public information is selected, in response to the user's selection,
searching the public information,
providing the user with general information relevant to the zone,
and in response to the user's indication of inadequate general information, expanding the search to at least one additional zone surrounding the zone.

2. The method of claim 1, wherein determining that the user is a resident of the geographic area comprises authenticating the user.

3. The method of claim 2, wherein authenticating the user comprises using at least one of unique information, a password, and other information specified by the user.

4. The method of claim 1, wherein the user is one of an individual, a business, and an organization.

5. The method of claim 1, wherein searching the public information comprises receiving input from an area within a map to focus the search.

6. The method of claim 5, wherein the node can receive the input from the area on the map, to focus the search, before and after initiating the search.

7. The method of claim 1, wherein searching the public information comprises receiving input from an area within an aerial image to focus the search.

8. The method of claim 7, wherein the node can receive the input from the area on the aerial image, to focus the search, before and after initiating the search.

9. The method of claim 1, wherein the information relevant to the zone includes information about businesses in the geographic area corresponding to the zone.

10. The method of claim 9, wherein the information about businesses in the geographic area includes information related to a target market for the businesses.

11. The method of claim 1, wherein the information relevant to the zone includes information about residences in the geographic area corresponding to the zone.

12. The method of claim 1, wherein the information relevant to the zone comprises at least one of demographic, socioeconomic, and housing profiles.

13. A computer-implemented method for providing information relevant to a selected geographic area, comprising the steps of:
establishing a database including information for a plurality of geographic areas; receiving a request to access information from the database relevant to a selected geographic area;
allowing the user to select between private and public information within the database that is associated with the selected geographic area;
enabling the user to execute a search and view the selected information for the selected geographic area, wherein if a request for private information is received, a determination is made whether the user is a resident of the selected geographic area before allowing the user to modify information contained in the database for the selected geographic area, and storing an electronic postmark in an archive database to record a user request to modify the information, wherein the electronic postmark includes a digital signature;
if a request is received for public information, and in response to the user's indication of inadequate selected information, enabling the user to search at least one geographic area surrounding the selected area.

14. The method of claim 13, wherein determining whether the user is a resident of the geographic area comprises authenticating the user's unique information, password, and other information specified by the user.

15. The method of claim 13, wherein the user is one of an individual, a business, and an organization.

16. The method of claim 13, wherein searching the public information comprises receiving input from an area within a map to focus the search.

17. The method of claim 16, wherein the input from the area on the map can be received, to focus the search, before and after initiating the search.

18. The method of claim 13, wherein searching the public information comprises receiving an input from an area within an aerial image to focus the search.

19. The method of claim 18, wherein the input from the area on the aerial image can be received, to focus the search, before and after initiating the search.

20. The method of claim 13, wherein the public information relevant to the geographic area comprises information relevant to businesses in the geographic area.

21. The method of claim 20, wherein the information relevant to businesses in the geographic area comprises sales offers and information related to a target market of the businesses.

22. The method of claim 13, wherein the public information relevant to the geographic area comprises information relevant to residences in the geographic area.

23. The method of claim 13, wherein the public information relevant to the geographic area comprises demographic, socioeconomic, and housing profiles.

24. A system that provides geographic information, comprising:
a node on a network that contains a database, and that:
provides information related to a plurality of geographic areas,
receives a user selection between private and public information within a geographic area,
if private information is selected, the node determines whether the user is a resident in the geographic area, and if the user resides in the geographic area, allows the user to modify information contained within the database, and stores an electronic postmark in an archive database to record the modification of the information, wherein the electronic postmark includes a digital signature;
if public information is selected, in response to the user's selection, searches the public information and provides the user with general information relevant to the geographic area, in response to the user's indication of inadequate general information, expands the search to at least one additional geographic area surrounding the geographic area.

25. The system of claim 24, wherein the node determines whether the user resides in the geographic area by authenticating the user's unique information, password, and other information specified by the user.

26. The system of claim 24, wherein the user is one of an individual, a business, and an organization.

27. The system of claim 24, wherein the node can focus the search of the public information by receiving input from an area within a map.

28. The system of claim 27, wherein the input from the area on the map can be received, to focus the search, before and after initiating the search.

29. The system of claim 24, wherein the node can focus the search of the public information by receiving input from an area within an aerial image.

30. The system of claim 29, wherein the input from the area on the aerial image can be received, to focus the search, before and after initiating the search.

31. The system of claim 24, wherein the public information relevant to the geographic area comprises information relevant to businesses in the geographic area.

32. The system of claim 24, wherein the node can expand the search using a multi-stage search to provide the user with the information relevant to the geographic area.

33. The system of claim 31, wherein the information relevant to businesses in the geographic area comprises sales offers and information related to a target market of the businesses.

34. The system of claim 24, wherein the public information relevant to the geographic area comprises information relevant to residences in the geographic area.

35. The system of claim 24, wherein the public information relevant to the geographic area comprises demographic, socioeconomic, and housing profiles.

36. A computer-implemented method for providing geographic information via a network, comprising the steps of:
    establishing a network node containing public and private information related to a plurality of ZIP Codes;
    receiving a first request from a user to access the node;
    enabling the user to view the information related to a zone;
    receiving a user selection of private or public information;
    if private information is selected, determining whether the user is a resident of a ZIP Code corresponding to the zone;
    modifying user information contained in the node for the zone in response to a second user request and storing an electronic postmark in an archive database to record the second user request, wherein the electronic postmark includes a digital signature, if it is determined that the user resides in the ZIP Code corresponding to the zone;
    if the public information is selected, in response to the user's selection, searching the public information and providing the user with general information relevant to the zone, in response to the user's indication of inadequate general information, expanding the search to at least one additional zone surrounding the zone.

37. The method of claim 36, wherein determining that the user resides in the ZIP Code comprises authenticating the user.

38. The method of claim 37, wherein authenticating the user comprises using at least one of unique information, a password, and other information specified by the user.

39. The method of claim 36, wherein the user is one of an individual, a business, and an organization.

40. The method of claim 36, wherein searching the public information comprises receiving input from an area within a map to focus the search.

41. The method of claim 40, wherein the node can receive the input from the area on the map, to focus the search, before and after initiating the search.

42. The method of claim 36, wherein searching the public information comprises receiving input from an area within an aerial image to focus the search.

43. The method of claim 42, wherein the node can receive the input from the area on the aerial image, to focus the search, before and after initiating the search.

44. The method of claim 36, wherein the information relevant to the zone includes information about businesses in the Zip Code corresponding to the zone.

45. The method of claim 44, wherein the information about businesses in the ZIP Code includes information related to a target market for the businesses.

46. The method of claim 36, wherein the information relevant to the zone includes information about residences in the ZIP Code corresponding to the zone.

47. The method of claim 36, wherein the information relevant to the zone comprises at least one of demographic, socioeconomic, and housing profiles.

48. A system that provides geographic information, comprising: a node on a network that contains a database, and that:
    provides information related to a plurality of ZIP Codes,
    receives a user selection between private and public information within a ZIP Code,
    if private information is selected, the node determines whether the user is a resident in the ZIP Code, and if the user resides in the ZIP Code, allows the user to modify information contained within the database in response to a user request, and stores an electronic postmark in an archive data base to record the user request, wherein the electronic postmark includes a digital signature,
    if public information is selected, in response to the user's selection, searches the public information and provides the user with general information relevant to the ZIP Code, in response to the user's indication of inadequate general information, expands the search to at least one additional ZIP Code surrounding the ZIP Code.

49. The system of claim 48, wherein the node determines whether the user resides in the ZIP Code by authenticating the user's unique information, password, and other information specified by the user.

50. The system of claim 48, wherein the user is one of an individual, a business, and an organization.

51. The system of claim 48, wherein the node can focus the search of the public information by receiving input from an area within a map.

52. The system of claim 51, wherein the input from the area on the map can be received, to focus the search, before and after initiating the search.

53. The system of claim 48, wherein the node can focus the search of the public information by receiving input from an area within an aerial image.

54. The system of claim 53, wherein the input from the area on the aerial image can be received, to focus the search, before and after initiating the search.

55. The system of claim 48, wherein the public information relevant to the ZIP Code comprises information relevant to businesses in the ZIP Code.

56. The system of claim 55, wherein the information relevant to businesses in the ZIP Code comprises sales offers and information related to a target market of the businesses.

57. The system of claim 48, wherein the public information relevant to the ZIP Code comprises information relevant to residences in the ZIP Code.

58. The system of claim 48, wherein the public information relevant to the ZIP Code comprises demographic, socioeconomic, and housing profiles.

59. The method of claim 1, wherein the at least one additional zone is adjacent to the zone.

60. The method of claim 13, wherein the at least one geographic area is adjacent to the selected geographic area.

61. The system of claim 24, wherein the at least one additional geographic area is adjacent to the geographic area.

62. The method of claim 36, the at least one additional zone is adjacent to the zone.

63. The system of claim 48, wherein the at least one additional ZIP code is adjacent to the ZIP code.

* * * * *